United States Patent
Byrne

[15] 3,666,906
[45] May 30, 1972

[54] CARBIDE DEPOSITION STRUCTURE AND METHOD

[72] Inventor: Thomas D. Byrne, 4455 Knapp Avenue, N.E., Grand Rapids, Mich. 49505

[22] Filed: June 4, 1969

[21] Appl. No.: 840,092

Related U.S. Application Data

[63] Continuation-in-part of Ser. No. 543,350, Apr. 18, 1966, abandoned.

[52] U.S. Cl. .......................... 219/76, 219/131, 219/135, 323/22 SC
[51] Int. Cl. .......................................................... B23k 9/04
[58] Field of Search ............... 219/76, 135, 131; 323/22 SC

[56] References Cited

UNITED STATES PATENTS

| | | | |
|---|---|---|---|
| 3,062,949 | 11/1962 | Lippart et al. | 219/125 R |
| 2,784,349 | 3/1957 | Anderson | 219/135 X |
| 3,008,036 | 11/1961 | Greene et al. | 219/131 |
| 3,296,408 | 1/1967 | Arnoldy | 219/76 |
| 3,184,578 | 5/1965 | Albers et al. | 219/76 X |
| 3,350,538 | 10/1967 | Johnson | 219/131 X |
| 3,382,345 | 5/1968 | Normando | 219/135 X |
| 3,460,025 | 8/1969 | De Prisco | 219/131 X |

Primary Examiner—J. V. Truhe
Assistant Examiner—L. A. Schutzman
Attorney—Whittemore, Hulbert & Belknap

[57] ABSTRACT

The carbide deposition structure of the invention includes a power supply connected in series with a switch across a carbide electrode and workpiece, a low voltage, low frequency oscillator operably associated with the switch for turning the switch on and off and a high frequency, high voltage oscillator for initiating an arc between the electrode and workpiece while the switch is turned on, after which the arc is sustained by the power supply until the switch is turned off. The method of carbide deposition disclosed includes connecting a power supply across a workpiece and a carbide electrode through a switch, closing and opening the switch by means of a low voltage, low frequency signal and initiating an arc between the electrode and workpiece during the time the switch is closed by means of a high voltage, high frequency source of electrical energy and sustaining the arc between the electrode and workpiece until the switch is subsequently opened.

12 Claims, 4 Drawing Figures

Patented May 30, 1972
3,666,906
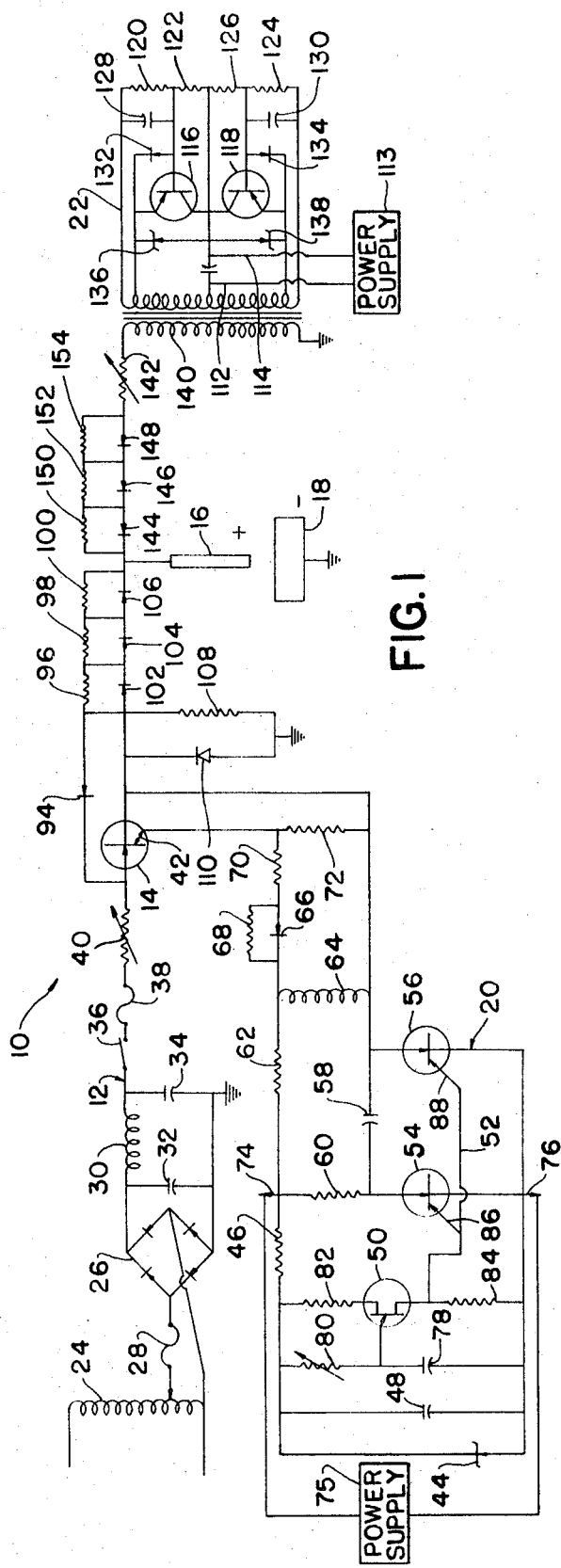
INVENTOR.
THOMAS D. BYRNE
BY Whittemore, Hulbert
& Belknap
ATTORNEYS

CARBIDE DEPOSITION STRUCTURE AND METHOD

CROSS-REFERENCE TO RELATED APPLICATION

This application is a continuation-in-part of my application, Ser. No. 543,350, filed Apr. 18, 1966, now abandoned.

In the past carbide deposition or plating has been accomplished by connecting a carbide electrode and a steel workpiece across a capacitor bank which in turn is connected to a direct current power supply and vibrating the electrode and workpiece into and out of contact with each other to provide arcing therebetween. As arcing takes place between the electrode and workpiece small spheres of carbide are deposited in the surface of the workpiece to make the surface hard and wear-resistant.

Such apparatus in the past has been unsatisfactory in that physical vibrating of the electrode or workpiece is practically limited to a predetermined frequency. In the past a frequency of sixty cycles per second has been usual. Such vibration rate produces relatively slow carbide deposition. In addition the physical contact of the workpiece with the electrode is undesirable in that actual damage to one or the other may result from such physical contact.

It is therefore an object of the present invention to provide improved carbide deposition structure.

Another object is to provide structure for depositing carbide in a metal workpiece surface from a carbide electrode without vibrating the electrode or the workpiece.

Another object is to provide carbide deposition structure including a power circuit for providing carbide deposition power having a series power source and switch therein connected across a carbide electrode and metal workpiece, a low voltage, low frequency switching oscillator connected to the switch for periodically actuating the switch to connect the power source across the electrode and workpiece and a high frequency, high voltage initiating oscillator connected across the electrode and workpiece for initiating an arc between the electrode and the workpiece which is sustained during the on period of the switch.

Another object is to provide an improved oscillator circuit which is simple, economical and efficient.

Another object is to provide an improved method of depositing carbide on a metal workpiece from a carbide electrode which does not include vibration of the electrode or workpiece.

Another object is to provide an improved method of carbide deposition comprising connecting a carbide deposition power circuit having a switch therein across a carbide electrode and a metal workpiece switching the switch on and off at a predetermined relatively low frequency to provide a low voltage carbide deposition power signal between the electrode and workpiece and gating the carbide deposition power signal between the electrode and workpiece by means of a high frequency, high voltage oscillator having an output connected across the electrode and workpiece.

Another object is to provide a carbide deposition structure and method which is simple, economical and efficient.

Other objects and features of the invention will become apparent as the description proceeds, especially when taken in conjunction with the accompanying drawings, illustrating a preferred embodiment of the invention.

BRIEF DESCRIPTION OF THE DRAWING

FIG. 1 is a schematic diagram of carbide deposition structure for performing the method of the invention.

FIG. 2 is a graph of the current through the carbide deposition power switch and the output of the low voltage switching oscillator of the carbide deposition structure of FIG. 1 in relative relation.

FIG. 3 is a graph illustrating the relation between the voltage and current across the gap between the electrode and workpiece associated with the carbide deposition structure of FIG. 1.

FIG. 4 is a graph illustrating the output voltage of the power circuit as controlled by the switching oscillator, the output voltage of the initiating oscillator and the resulting composite voltage across the spark gap between the electrode and workpiece associated with the carbide deposition structure of FIG. 1.

DESCRIPTION OF THE PREFERRED EMBODIMENT

With particular reference to the figures of the drawing, one embodiment of the present invention will now be considered in detail.

The carbide deposition apparatus 10 illustrated in FIG. 1 includes a power circuit 12 including a silicon control switch 14 connected across a carbide electrode 16 and a steel workpiece 18. A low frequency, low voltage oscillator circuit 20 is connected to turn the switch 14 on and off. The carbide deposition apparatus 10 is completed by the high frequency, high voltage oscillator circuit 22 which is also connected across the electrode 16 and workpiece 18.

In operation a low voltage square wave of electrical energy is passed through the switch 14 at a frequency controlled by the low voltage oscillator circuit 20 and is applied across the electrode 16 and workpiece 18. The high frequency, high voltage oscillator is on at all times during operation of the apparatus 10. On simultaneous occurrence of the square wave signal from the power circuit 12 and the high frequency, high voltage signal from the oscillator circuit 22 a sustained low voltage, high current arc passes between the electrode 16 and workpiece 18 until the switch 14 is turned off. Small spheres of carbide are thus transferred from the electrode 16 to the workpiece 18 and are bonded into the surfaces thereof.

More specifically the power circuit includes a 110-volt, single phase variac 24 supplying from 0 to 130 volts output into a full wave bridge rectifier circuit 26 through a fuse 28. The bridge rectifier 26 is connected to provide a filtered output across the inductance 30 and capacitor 32 to the capacitor 34. The capacitor 34 which in practice may be a bank of capacitors is connected across the carbide electrode 16 and the steel workpiece 18 through manual switch 36, fuse 38, variable current limiting resistor 40 and the silicon control switch 14.

The silicon control switch 14, which is commercially available, has the characteristics of an electric switch which is turned on and off by alternate actuation so that the switch 14 alternates between on and off conditions in response to actuating pulses to the control electrode 42 from the oscillator circuit 20. The switch 14 is adapted to be turned on by a fifty milliampere signal to the electrode 42 due to the high turn-on gain thereof and is adapted to be turned off by a 500-milliampere signal applied to the electrode 42 thereof due to the low turn-off gain of the switch 14.

The oscillator circuit 20 for controlling the switching of the silicon control switch 14 includes a Zener diode 44 which in conjunction with the resistor 46 and capacitor 48 provides a controlled direct current voltage to the unijunction transistor circuit 50. The unijunction transistor circuit 50 in turn actuates the silicon controlled flip-flop circuit 52 including the silicon controlled rectifiers 54 and 56, capacitor 58, load resistor 60, current dropping resistor 62 and load inductance 64. The coupling circuit from the oscillator circuit 20 to the switch 14 includes the clipping diode 66, resistor 68 and the current limiting resistor 70 and resistor 72. The power input to the oscillator circuit 20 is over the conductors 74 and 76 from a conventional, isolated 32-volt direct current power supply 75.

In operation with the direct current power input over the conductors 74 and 76 at approximately 32 volts, 12 volts maintained by the Zener diode 44 will cause the capacitor 78 to charge through the variable resistance 80. On the capacitor 78 being charged to the firing bias of the unijunction transistor 50 as determined by the value of the load resistors 82 and 84 of the unijunction transistor, the capacitor 78 will discharge rapidly through the load resistor 84. Discharge of the capacitor 78 through the resistor 84 will produce a pulse of electric energy on the control electrodes 86 and 88 of the silicon controlled rectifiers 54 and 56 which will turn both of the rectifiers 54 and 56 on.

Because of the relatively high resistance 60 in the circuit of the silicon controlled rectifier 54 after the pulse of energy from the unijunction transistor 50 is removed from the silicon controlled rectifier 54, it will turn off. However, because of the low impedance offered by the relatively small resistor 62 and the coil 64, the silicon controlled rectifier 56 will be maintained in an on condition. On the next firing pulse from the unijunction transistor 50 to the control electrodes 86 and 88 of the silicon controlled rectifiers 54 and 56, the silicon controlled rectifier 54 will again be turned on and the silicon controlled rectifier 56 which has been maintained in an on condition will be turned off by the discharging of the capacitor 58 therethrough. The silicon controlled rectifier 54 will again be turned off due to the relatively high resistance 60 in the circuit thereof. The cycle then repeats itself on the next firing pulse from the unijunction transistor on the electrodes 86 and 88.

Because the turn-on gain of the silicon controlled switch 14 is high, the clipping circuit including the diode 66 and resistor 68 is provided in series with the relatively small resistor 70 to limit the signal to the switch 14 through the resistor 70 and diode 66 to 1 volt at 50 milliamps for turn-on. The same circuit provides approximately 12 volts at 700 milliamps for turn-off at the switching electrode 42 of switch 14.

The wave shape of the square wave through the switch 14 to the electrode 16 and the superimposed control signal from the oscillator circuit 20 to the switch 14 are illustrated best in FIG. 2 wherein the upper line 90 is the signal at the electrode 42 of switch 14 and the lower line 92 is the power signal through the switch 14.

Diode 94 is provided across the silicon controlled switch 14 to prevent damage to the switch 14 due to its inverse peak voltage being exceeded.

The resistors 96, 98 and 100 along with the diodes 102, 104 and 106 are provided to prevent the high voltage from the oscillator circuit 22 from appearing across the switch 14. The resistors form a voltage divider to insure that the peak inverse voltage of the individual diode rectifiers 102, 104 and 106 is not exceeded. A single rectifier could be used to replace the rectifiers 102, 104 and 106 providing the peak inverse voltage thereof were high enough.

Resistor 108 provides a load into which the switch 14 feeds the power stored in the capacitor 34 when the switch 14 is turned on and the gap between the electrode 16 and workpiece 18 is too great to permit forming of an arc therebetween. Diode 110 is to prevent negative half cycles from the high voltage circuit 22 from appearing in the low voltage circuit.

The high voltage oscillator circuit 22 is a direct current to alternating current square wave inverter. This circuit converts 32 volts direct current fed thereto over conductors 112 and 114 from the separate power supply 113 to 1,200 volts alternating current at 18 kilocycles. The transistors 116 and 118 are connected in a common emitter configuration, as shown. Resistors 120 and 122, 124 and 126 limit the base currents of the transistors once the circuit begins to oscillate. Capacitors 128 and 130 are provided to speed turn-on and turn-off of the transistors 116 and 118 to minimize switching time, while the diodes 132 and 134 are emitter base clamping diodes to keep from reverse biasing the emitter base junctions beyond their inverse peak ratings. Zener diodes 136 and 138 are necessary to keep the collector to emitter voltages of transistors at a save value.

The output voltage of the oscillator circuit 22 is sufficient when passed through transformer 140, variable load resistance 142, and the diodes 144, 146 and 148 in parallel with the voltage dividers 150, 152 and 154 to initiate an arc between the electrode 16 and the workpiece 18. The power from oscillator circuit 22 is however insufficient to sustain the arc or produce plating of the electrode material on the workpiece.

Thus, in overall operation of the carbide deposition apparatus 10 the electrode 16 is moved into a predetermined relation to the workpiece 18, as for example a distance of a few thousandths of an inch, which it will be understood may be maintained by the usual servo system feeding either the electrode or the workpiece toward the other by means of a bridge circuit sensing the voltage or current across the gap, or both. The switch 36 is then closed and the low voltage oscillator 20 and the high voltage oscillator 22 are energized if they have not previously been energized.

The high voltage, high frequency oscillator will thus produce across the gap between the electrode and workpiece the positive alternations of the high frequency signal produced thereby since the negative alternations are cut off by the diodes 102, 104 and 106 and appear across diodes 144, 146 and 148, which again could be a single diode having a sufficiently high inverse peak voltage. This signal is shown at B in FIG. 4. The silicon controlled switch 14 is turned on and off at a selected frequency of between 30 and 1,000 cycles per second, determined by the setting of the variable resistance 80 to provide a square wave output pulse, as indicated at A in FIG. 4. This signal is also impressed across the electrode 16 and workpiece 18 in FIG. 1.

The resulting voltage across the electrode and workpiece is, as shown at C in FIG. 4, initially a voltage peak high enough to cause the initiation of an arc between the electrode 16 and the workpiece 18, as shown at C in FIG. 4. After initiation of the arc the current between the electrode and workpiece reaches a very high value due to the discharging of the capacitor bank 34 through the arc, whereby the voltage across the electrode 16 and workpiece 18 drops from the point 156 to the point 158, as shown in FIG. 3, with the indicated increase in current. The heavy current flow between the electrode 16 and the workpiece 18 with the polarity indicated causes a tiny sphere of carbide to be imbedded in the surface of the steel workpiece 18 during each on period of the silicon controlled switch 14. When the silicon controlled switch 14 is subsequently turned off by the oscillator circuit 20, the current between the electrode 16 and workpiece 18 will be insufficient to maintain the established arc and the arc will be extinguished. Subsequent voltage pulses from the high voltage oscillator 22 will break down the gap between the electrode and workpiece but will be insufficient to provide a sustained arc therebetween until the silicon controlled switch 14 is again turned on.

It will thus be seen that there is provided in accordance with the invention apparatus for carbide deposition on a steel workpiece which requires no mechanical vibrating apparatus for operation to initiate and extinguish arcs. Plating is thus accomplished up to ten times as fast with the carbide deposition apparatus 10 illustrated in comparison to mechanical vibrating apparatus and there is no physical damage to the electrode or workpiece due to contacts therebetween.

While one embodiment of the present invention has been considered in detail, it will be understood that other embodiments and modifications are contemplated by the inventor. Thus, with reverse polarity the techniques disclosed above may be used to provide an electrical discharge machine for machining conductive materials. Further, it will be understood that if desired a voltage control may be provided to permit uniform carbide deposition over sustained periods where electrode wear might otherwise affect the drawing of an arc or the characteristics thereof. Thus, as the electrode wears, it would be possible to increase the voltage to insure proper gap break down.

Also, it will be readily understood that the electrode may be a substantially flat ended electrode or may be curved or otherwise shaped to conform to a surface to be plated. Alternatively blind openings, holes or the like may be plated by an electrode machined to provide proper clearance between the opening or hole and the electrode with the electrode positioned in the electrode or hole.

Further, while a silicon carbide electrode has been disclosed, it will be understood that the particular electrode is not critical. Other electrode material (such as sintered carbide, boride, nitride or silicide may be used in the structure of the invention in accordance with the invention. The selection of the most desirable electrode for a particular job will be in accordance with established knowledge in the carbide deposition art and as document in the literature such as the Inoue U.S. Pat. No. 3,098,150, the Adcock U.S. Pat. No. 3,097,291, and the Brutcher technical translations included in the prosecution of the above referenced parent patent application.

What I claim as my invention is:

1. Apparatus for hardening a surface of a conducting workpiece by electrical deposition of carbide thereon comprising a carbide electrode, a source of electric energy, switching means in series with the source of electric energy, said source of energy and switching means being positioned across said electrode and a workpiece having a predetermined gap therebetween, low frequency, low voltage electric signal generating means operably connected to the switching means for switching the switching means on and off to provide spaced welding pulses said high frequency generating means, and high voltage, high frequency electric signal generating means connection means for connecting across the gap between the electrode and workpiece for providing a continuous high voltage, high frequency signal thereacross for breaking down the gap when the switching means is turned on, after which an electric discharge is maintained across the gap between the electrode and workpiece until the switching means is turned off.

2. Structure as set forth in claim 1 wherein the switching means is a silicon controlled switch having a control electrode connected to the low voltage, low frequency electric signal generating means.

3. Structure as set forth in claim 1 wherein the low voltage, low frequency electric signal means comprises an oscillator including a pair of silicon controlled rectifiers driven by a unijunction transistor.

4. Structure as set forth in claim 1 wherein the high voltage, high frequency electric signal generating means is a direct current to alternating current square wave inverter.

5. Structure as set forth in claim 1 and further including means connected across the gap between the electrode and workpiece for isolating the switching means, and low voltage, low frequency electric signal generating means from the high voltage, high frequency electric signal generating means.

6. Structure as set forth in claim 1 wherein the workpiece is steel, and the positive terminal of the source of electric energy is connected to the electrode, and the negative terminal is connected to the workpiece.

7. The method of hardening a conducting workpiece by electrical deposition of carbide thereon comprising connecting the workpiece and electrode having a predetermined gap therebetween in series with switching means and a source of electric energy, switching the switching means by means of a low frequency, low voltage electric signal to provide spaced welding pulses, and breaking down the gap between the electrode and workpiece by continuously applying a high voltage, high frequency electric signal across the gap.

8. The method as set forth in claim 7 and further including protecting the switching means and low voltage, low frequency electric signal generating means from the signals of the high voltage, high frequency electric signal generating means.

9. Apparatus for hardening a conducting workpiece by the deposition of carbide thereon comprising a carbide electrode, means for supporting said carbide electrode in spaced relation to the workpiece to be hardened, a source of electrical energy and switch means connected in series with each other and connected across the means for supporting said electrode and the workpiece, said source of electrical energy being sufficient to sustain an arc across said electrode carried by the means for supporting said electrode and the workpiece after the arc has been initiated therebetween, a low voltage, low frequency source of electrical energy connected to the switch means for opening and closing the switch means to provide spaced welding pulses and a high voltage, high frequency source of electrical energy connection means for connecting said high frequency source of energy across the means for supporting said electrode and the workpiece for providing a continuous high voltage, high frequency signal thereacross for initiating an arc between said electrode carried by the means for supporting an electrode and the workpiece on closing of the switch means.

10. Apparatus for hardening a steel workpiece by the deposition of carbide thereon comprising a carbide electrode, a variac source of variable voltage alternating electric energy, a full wave rectifier connected to the variac for rectifying the alternating output voltage thereof, an inductance capacitance filter circuit connected to the rectifier circuit for filtering the rectified output signal of the rectifier to provide direct current electrical energy sufficient to maintain an arc between said carbide electrode and a steel workpiece maintained in predetermined spaced apart relation after the arc has been established but insufficient to establish the arc, a switch, variable resistance means and the principal electrodes of a silicon controlled rectifier having two principal electrodes and a control electrode connected in series with the direct current electrical energy, the electrode and workpiece, a source of low frequency, low voltage oscillations connected between the control electrode and one of the principal electrodes of the silicon controlled rectifier for turning the silicon controlled rectifier on and off at the low frequency to provide spaced welding pulses, a high voltage, high frequency oscillator, connection means for connecting said oscillator across said carbide electrode and workpiece for continuously providing a high voltage, high frequency signal between the electrode and workpiece insufficient to maintain an arc therebetween but sufficient to initiate an arc on turning on of the silicon controlled rectifier to connect the source of direct current electric energy across the electrode and workpiece, a diode and resistor in parallel connected between the high voltage, high frequency oscillator and said carbide electrode and workpiece for isolating the high frequency, high voltage oscillator from the direct current electrical energy, and resistance and diode means connected in parallel between the silicon controlled rectifier and said carbide electrode and workpiece for isolating the silicon controlled rectifier and low frequency, low voltage oscillation source from the high voltage, high frequency oscillator whereby on occurrence of a low frequency, low voltage electrical signal the direct current electrical energy is applied across said carbide electrode and steel workpiece and an arc is initiated between said carbide electrode and workpiece by the high frequency, high voltage source of electrical energy, which arc is maintained by the direct current electrical energy until the silicon controlled rectifier is subsequently turned off to deposit a carbide nodule on the surface of the steel workpiece.

11. Structure as set forth in claim 10 wherein the source of low frequency, low voltage oscillations includes a separate source of direct current electrical energy, means for regulating the electrical energy from the separate direct current source, a unijunction transistor circuit connected to the power supply for providing an output pulse at a predetermined frequency and a first and second silicon controlled rectifier connected in a multivibrator circuit to receive the output pulses of the unijunction transistor circuit for producing output square wave electric signals in accordance with the frequency of the output pulses from the unijunction transistor and means for applying the output signals from the multivibrator across the control electrode and the one principal electrode of the silicon controlled rectifier at different turn-on and turn-off power levels including a parallel resistor and diode in the output circuit of the multivibrator.

12. Structure as set forth in claim 11 wherein the high voltage, high frequency oscillator comprises a pair of transistors having emitter, base and collector electrodes, a transformer having a secondary winding in series with the electrode and workpiece and a secondary winding, a voltage divider network connected across the secondary winding of the transformer, a first capacitor one side of which is connected centrally of the secondary winding of the transformer and the other side of which is connected centrally of the voltage divider network, the bases of the transistors being connected to the voltage divider between the capacitor and opposite ends of the voltage divider network, a separate capacitor connected between the base of the transistors and the respective ends of the voltage divider network, a separate diode connected between the base and emitter of each of the transistors, a pair of zener diodes connected in series with opposite polarities between the emitters of the transistors, and an alternating current power supply connected across the first capacitor.

* * * * *